United States Patent [19]
Aritake et al.

[11] Patent Number: 5,589,957
[45] Date of Patent: Dec. 31, 1996

[54] STEREOSCOPIC DISPLAY APPARATUS USING CYLINDRICAL SCREEN

[75] Inventors: Hirokazu Aritake; Masayuki Kato; Masato Nakashima, all of Kawasaki, Japan

[73] Assignee: Fujitsu Limited, Kanagawa, Japan

[21] Appl. No.: 383,427

[22] Filed: Feb. 3, 1995

[30] Foreign Application Priority Data

Mar. 15, 1994 [JP] Japan .................................... 6-042989

[51] Int. Cl.⁶ .............................. G03H 1/26; G02B 27/46
[52] U.S. Cl. .............................. 359/23; 359/22; 359/562
[58] Field of Search .................................. 359/8, 22, 23, 359/25, 26, 30

[56] References Cited

U.S. PATENT DOCUMENTS

| | | | |
|---|---|---|---|
| 4,206,965 | 6/1980 | McGrew | 359/23 |
| 4,339,168 | 7/1982 | Haines | 359/23 |
| 4,364,627 | 12/1982 | Haines | 359/23 |
| 4,834,476 | 5/1989 | Benton | 359/23 |
| 4,988,154 | 1/1991 | Hansen | 359/27 |
| 5,111,313 | 5/1992 | Shires | 359/23 |
| 5,216,528 | 6/1993 | Honda et al. | 359/23 |
| 5,285,438 | 2/1994 | Marchand et al. | 359/29 |
| 5,400,155 | 3/1995 | Ueda et al. | 359/23 |

*Primary Examiner*—Jon W. Henry
*Attorney, Agent, or Firm*—Staas & Halsey

[57] ABSTRACT

A diffraction light modulated by a plane type phase distribution display device is deflected by an image formation optical system and is formed as an image onto a cylindrical screen surface and is diffused in the vertical direction by a unidirectional light diffusing section such as a lenticular lens or the like, so that a stereoscopic image can be seen. As a phase distribution display device, a liquid crystal device having pixels on the order of the wavelength in the circumferential direction and having coarse pixels in the radial direction is used. Thus, it is equivalent to that the phase distribution display device is located on the cylindrical surface. A cylindrical stereoscopic display can be performed by using the plane phase distribution display device.

20 Claims, 14 Drawing Sheets

STEREOSCOPIC DISPLAY APPARATUS USING CYLINDRICAL SCREEN

BACKGROUND OF THE INVENTION

The present invention relates to a stereoscopic display apparatus for displaying a stereoscopic image on the basis of three-dimensional data of an object or images of an object obtained by seeing the object from a plurality of visual directions and, more particularly, to a stereoscopic display apparatus by which a stereoscopic image can be seen in a whole range of 360° by using a cylindrical screen.

Generally, in a stereoscopic display in medical service or a layout of articles, it is required that a target object can be observed by a plurality of persons at a least distance of distinguished vision from arbitrary directions. In a stereoscopic display apparatus of a double-eye type which is represented by a glasses system, however, since the stereoscopic image can be seen only at a predetermined position, the image cannot be observed from an arbitrary direction. On the other hand, there is a stereoscopic display apparatus of a volume scanning type such that a device like a fan is rotated in the space and points are displayed in the space by a laser beam. In the display apparatus of the volume scanning type, the target object can be seen from an arbitrary direction. There is a problem, however, such that both of rear and front points are simultaneously seen, so that a problem on an image quality remains. A multiplex hologram such that a stereoscopic image can be observed from the directions of 360° by using a cylindrical hologram is also known in addition to the above apparatus. According to the multiplex hologram, however, the developing work which is executed after an interference exposure was performed to a cylindrical surface of a dry plate is complicated and it takes five hours or longer to form such a hologram. Moreover, another cylindrical hologram has to be newly formed of every different display object.

A multiplex hologram using a cylindrical liquid crystal display as shown in FIG. 1 is considered. In FIG. 1, for example, a liquid crystal display is used as a phase display device 500. A one-dimensional phase distribution of each horizontal stripe region which is obtained by dividing a display stereoscopic body 520 in the vertical direction and seeing the divided portions is displayed on the phase display device 500, for instance, as shown by a phase distribution 530-i. A lenticular screen 510 in which a plurality of lenticular lenses each having a micro width are cylindrically arranged is provided around the cylindrical phase display device 500 in order to diffuse the modulated light in the vertical direction. In a state in which the one-dimensional phase distribution in the horizontal direction is displayed on the phase display device 500, for example, when a coherent reproduction light is irradiated from the lower direction, the reproduction light is modulated in accordance with a hologram phase distribution displayed by the phase display device 500. The modulated light is enlarged in the vertical direction by the lenticular screen 510 and is emitted. Thus, the display stereoscopic body 520 can be seen in the screen 510 by eyes 28-1 and 28-2 of the observer.

In the stereoscopic display apparatus using the cylindrical display device, however, although a difference object can be displayed by rewriting the holographic phase distribution, it is difficult to construct the phase display device in a curved shape along the cylindrical surface. It is, therefore, difficult to realize a rewritable stereoscopic display apparatus by which an object can be observed from the directions of 360°.

SUMMARY OF THE INVENTION

According to the invention, a stereoscopic display apparatus by which an object can be observed from an arbitrary direction of 360° by using a plane-shaped phase display device.

A stereoscopic display apparatus of the invention comprises: a phase distribution display section; an image formation optical section; a curved screen surface; and a light diffusing section. The phase distribution display section records a holographic phase distribution for a stereoscopic display onto the plane, applies a light modulation according to the holographic phase distribution to an incident light, and emits the modulated light. The optical section deflects the light modulated by the phase distribution display section and forms an image on the curved screen surface. The light diffusing section diffuses the light formed on the curved screen surface in one direction. In this instance, the curved screen surface assumes a cylindrical surface. The optical section has a 0-th order light eliminating section to eliminate the 0-th order light (transmitted light) which is generated at the time of the modulation by the phase distribution display section. The 0-th order light eliminating section comprises a pair of Fourier conversion optical devices and a space filter which is arranged between the devices and shuts off the light at the 0-th order light transmitting position. When the modulated light is deflected to the curved screen surface, the image formation optical section further arranges micro optical devices in a concentric disk shape. For example, a grating lens or a Fresnel lens is used.

The phase distribution display section is formed by a disk-shaped device and displays a one-dimensional holographic phase distribution to each of the circumferential regions divided in the radial direction and modulates the incident light. For example, a disk member (hologram disk) on which the holographic phase distribution has fixedly been recorded is used.

When the display is enabled to be switched, a liquid crystal display device which functions as a disk-shaped space light modulating device is used. The liquid crystal device comprises a plurality of circumferential electrodes which are formed on one surface and are divided in the radial direction and a plurality of radial electrodes which are formed on the opposite surface through the liquid crystal and are divided in the circumferential direction. The region of the intersecting portion of both electrodes is set to a display pixel serving as a display unit of discrete phase distribution information.

Further, the liquid crystal display device comprises: a transfer control circuit for transferring holographic phase distribution data supplied from the outside to the corresponding electrode; a voltage generating circuit for holding the transfer data to each electrode and generating a corresponding voltage; and a switching circuit for applying the voltage generated by the voltage generating circuit to the electrode designated by address information.

As a modification of the phase distribution display section which is used in the invention, a fan-shaped phase distribution display device having a part of the recording region of the holographic phase distribution divided in the radial direction and circumferential direction is used and is recorded on a disk-shaped space light modulating device having a light writing function. For example, the space light modulating device having the light writing function is fixed and the phase distribution is sequentially written while the fan-shaped phase distribution display device is rotated step by step. A fan-shaped liquid crystal display device is used as a fan-shaped phase distribution display device in this case. In the liquid crystal display device, the region of the intersecting portion of the circumferential electrode and the radial electrode is set to a display pixel serving as a display unit of the discrete holographic phase distribution.

The light diffusing section provided for the curved screen surface is formed by a lenticular screen in which a plurality of lenticular lenses each having a microwidth are cylindrically arranged or a hologram screen to which a plurality of holograms each having a microwidth are cylindrically arranged.

According to the stereoscopic display apparatus of the invention, the diffraction light modulated by the plane-shaped phase distribution display section is deflected by the optical system and an image is formed on the cylindrical screen surface. Further, by enlarging the visual area in the vertical direction by a group of lenticular lenses or the like, a stereoscopic image can be seen. The plane-shaped phase distribution display section is formed by a liquid crystal device having a pixel width on the wavelength order in the circumferential direction and having a coarse pixel width in the radial direction. Thus, it is equivalent to that the phase distribution display section for displaying the holographic phase distribution and modulating the space light is provided on the cylindrical surface. Therefore, a holographic stereoscopic display apparatus in which an object can be observed at the least distance of distinguished vision from arbitrary directions can be easily realized by using the plane-shaped phase distribution display section.

The above and other objects, features, and advantages of the present invention will become more apparent from the following detailed description with reference to the drawings.

DETAILED DESCRIPTION OF THE PREFERRED EMBODIMENTS

Figure 2:
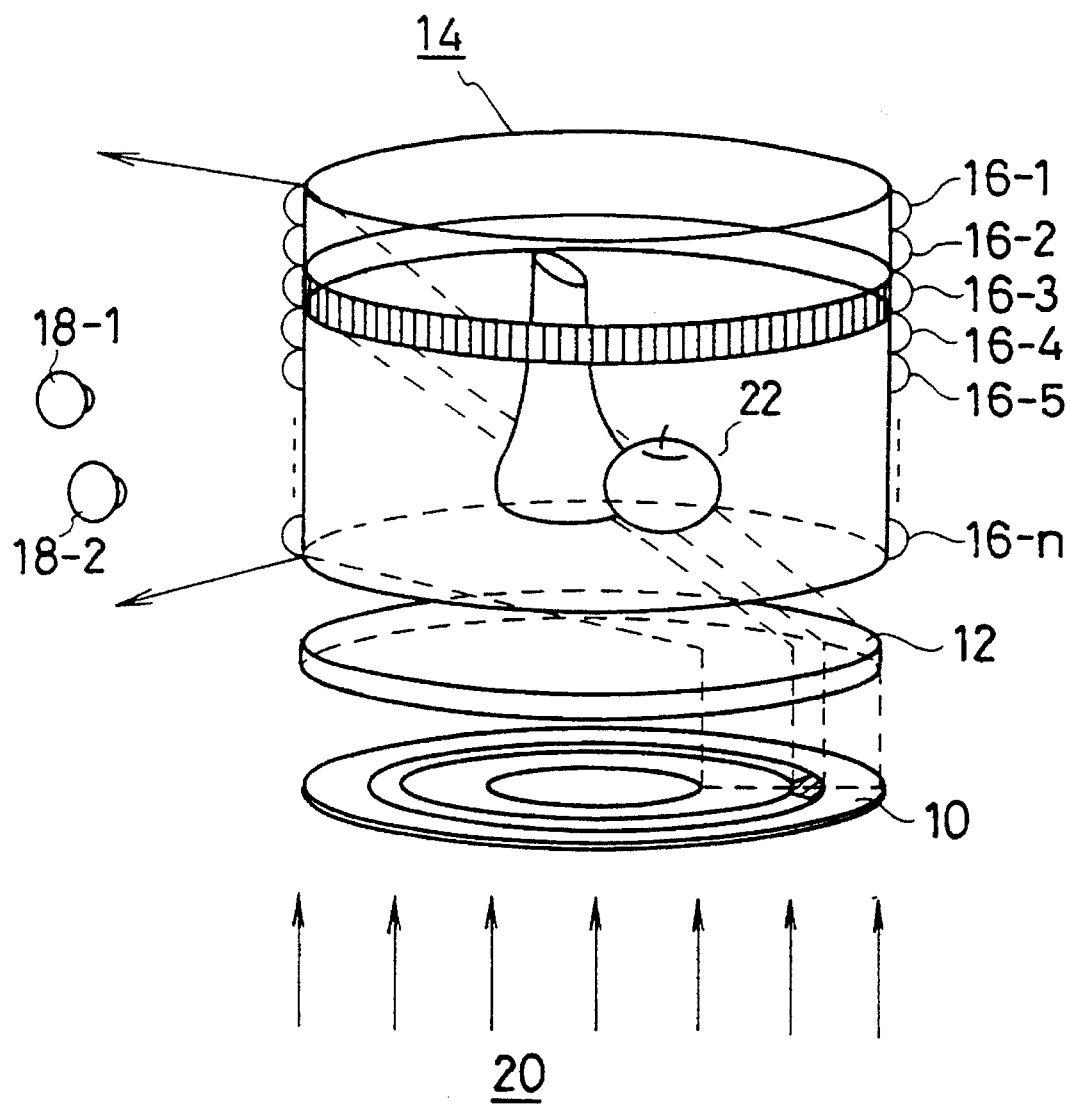
FIG. 2 is an explanatory diagram of a fundamental embodiment of the invention.

FIG. 2 shows a fundamental embodiment of the invention. A stereoscopic display apparatus of the invention comprises: a phase distribution display device 10 formed on a plane; an optical system 12; and a cylindrical screen 14 formed by a plurality of lenticular lenses 16-1 to 16-n. Display units of a discrete holographic phase distribution divided in the radial direction and the circumferential direction, namely, so called pixels are arranged on the phase distribution display device 10. In this case, the device 10 has pixels on the order of a wavelength in the circumferential direction and has coarse pixels in the radial direction. When a reproduction light 20 is irradiated to such a phase distribution display device 10 to which a one-dimensional phase distribution has been recorded or displayed in the circumferential direction, a diffraction light which was subjected to a deflection according to a one-dimensional holographic phase distribution in the circumferential direction is emitted. The optical system 12 forms a diffraction image from the plane-shaped phase distribution display device 10 onto the cylindrical screen 14. In this case, the image forming direction is only the vertical direction. Thus, it is equivalent to that the phase distribution display device 10 is formed on the cylindrical screen 14. Therefore, by using the plane-shaped phase distribution display device 10, the holographic stereoscopic display apparatus in which a stereoscopic image can be observed at a least distance of distinguished distance in an arbitrary direction of 360° by the cylindrical screen 14 can be realized.

Figure 1:
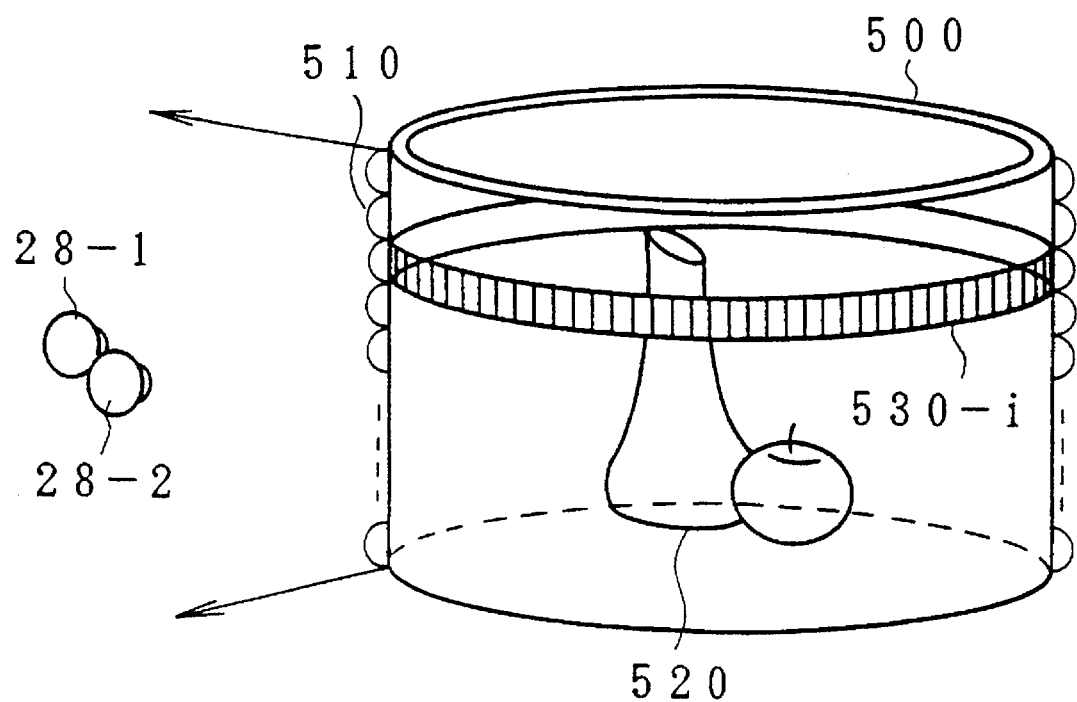
FIG. 1 is an explanatory diagram of a conventional stereoscopic display apparatus using a cylindrical display device.
Figure 3:
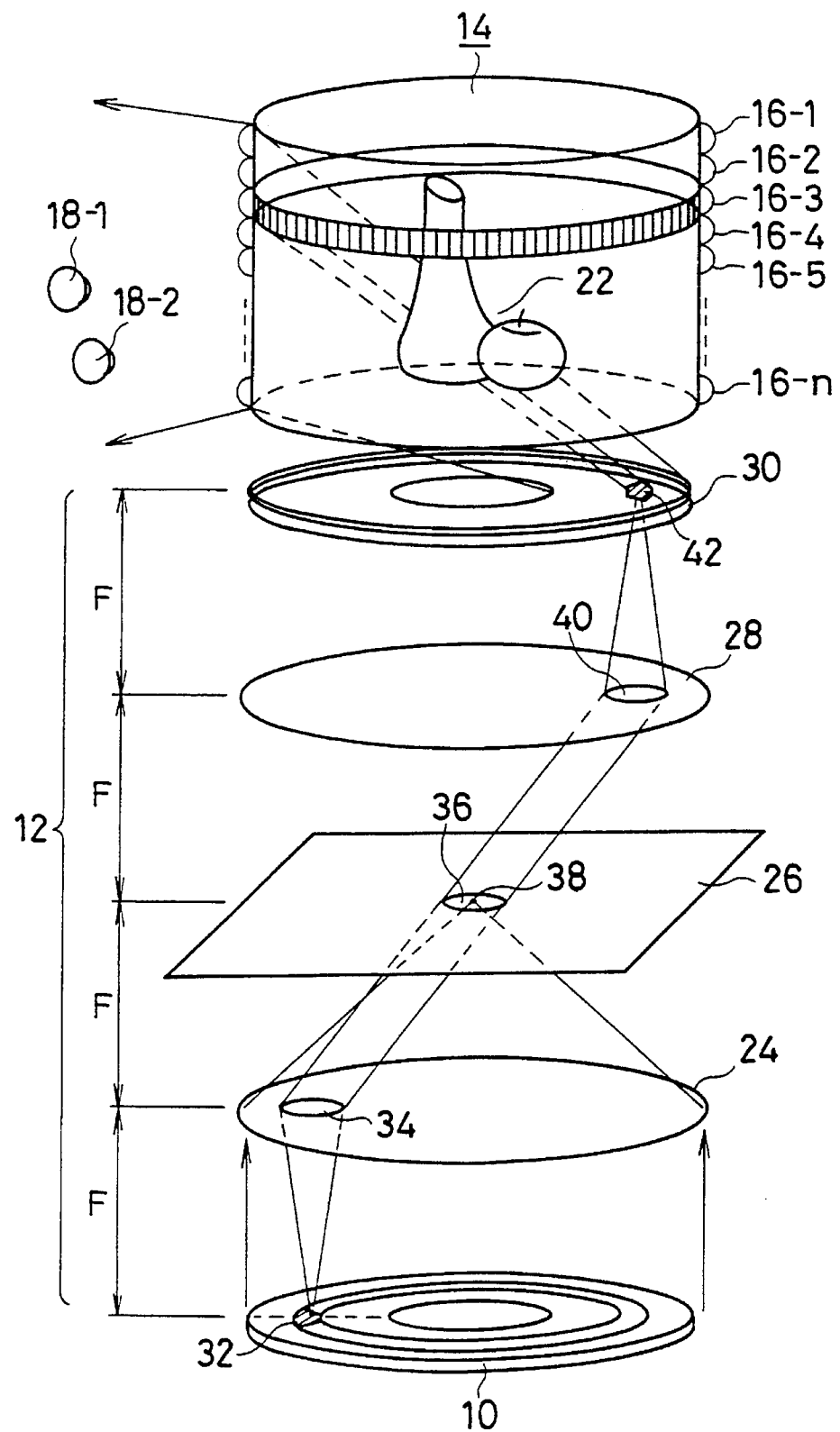
FIG. 3 is an explanatory diagram of an image formation optical system in FIG. 2.

FIG. 3 shows the optical system 12 in the embodiment of FIG. 1 in detail. The optical system 12 cuts out the 0-th order light (transmitted light) from the phase distribution display device 10 by a space filtering of a 4F optical system using a Fourier conversion lens 24, a space filter 26, a Fourier conversion lens 28, and a grating lens 30. When a one-dimensional holographic phase distribution 32 displayed on the wavelength order in the circumferential direction of the phase distribution display device 10 will now be considered as an example, the diffraction light from the 1-dimensional holographic phase distribution 32 is Fourier converted through a region 34 of the Fourier conversion lens 24 and passes through the space filter 26. After that, the light is inversely Fourier converted by the Fourier conversion lens 28 and a 1-dimensional holographic phase distribution 42 is formed on the grating lens 30. On the other hand, the 0-th order light (transmitted light) from the phase distribution display device 10 is condensed to the center of a light beam passing portion 36 of the space filter 26 by the Fourier conversion lens 24. Therefore, the image formation point on the space filter 26 to which the 0-th order light is condensed is set to a light shielding point 38, thereby enabling the 0-th order light from the phase distribution display device 10 to be cut.

The grating lens 30 forms a real image forming section of the 4F optical system 12. A diffraction light from the 1-dimensional holographic phase distribution expressed in the circumferential direction of the phase distribution display device 10 is formed as an image or is deflected on a corresponding horizontal region on the cylindrical screen 14. A Fresnel lens can be also used in place of the grating lens 30.

The cylindrical screen 14 constructs what is called a lenticular screen by cylindrically arranging the lenticular lenses 16-1 to 16-n divided in the vertical direction so as to each have a microwidth in the embodiment. Each of the ring-shaped lenticular lenses 16-1 to 16-n in the cylindrical screen 14 corresponds to the circumferential 1-dimensional holographic phase distribution expressed on the phase distribution display device 10 in a one-to-one corresponding manner.

An optical disk to which a holographic phase distribution has fixedly been recorded or a liquid crystal display apparatus which can switch and display a holographic phase distribution or the like can be used as a phase distribution display device 10. When the optical disk to which the holographic phase distribution has fixedly been recorded is used as a phase distribution display device 10, as for the display switching of the stereoscopic image, a plurality of different optical disks to each of which the holographic phase distribution for stereoscopic display has been recorded are prepared and are exchanged, thereby switching the display of the stereoscopic image. On the other hand, when the liquid crystal display apparatus is used as a phase distribution display device 10, the stereoscopic display can be switched by the dynamic display change-over of the holographic phase distribution.

Further, although what is called a lenticular screen using the lenticular lenses has been used as a cylindrical screen 14 in the embodiment, the cylindrical screen 14 can also be formed by using a hologram having a function to enlarge the vertical visual area which is equivalent to that of the lenticular screen. In the hologram screen, the convex and concave portions of the screen front surface are eliminated and the surface reflection can be reduced.

Figure 4:
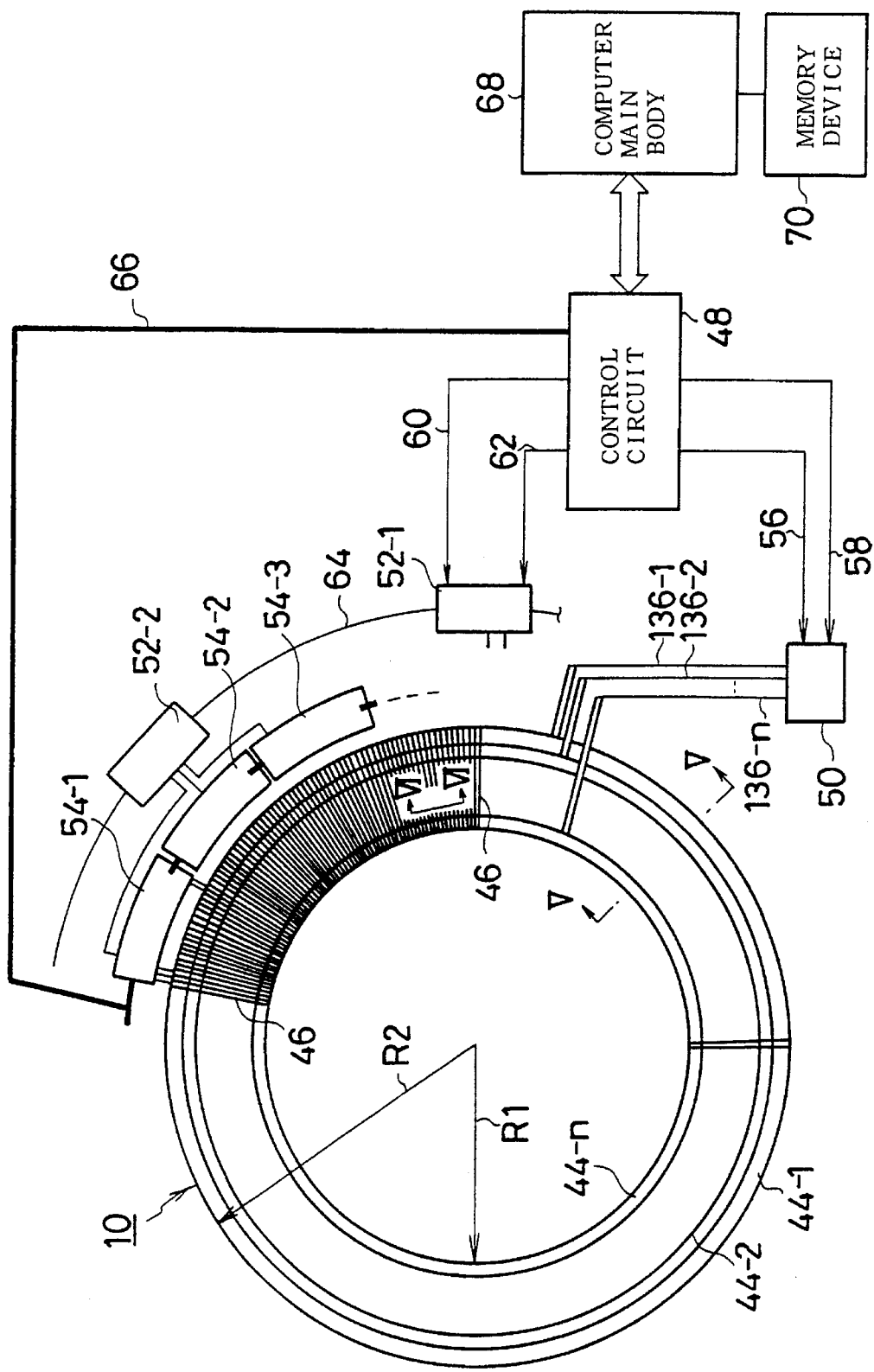
FIG. 4 is an explanatory diagram of a construction of a phase display device in FIG. 2 and driving circuits.

FIG. 4 shows an embodiment of a liquid crystal display apparatus which is used as a phase distribution display device of the invention. The phase distribution display device 10 using the liquid crystal display apparatus has radial transparent electrodes 46 which are radially patterned and cylindrical transparent electrodes 44-1 to 44-n which are concentrically patterned and has a structure such that a liquid crystal is sealed between both of the transparent electrodes. An orientation film exists between the transparent electrodes and the liquid crystal. When it is now assumed that an inner diameter R1 of the phase distribution display device 10 is equal to 200 mm and an outer diameter R2 is equal to 300 mm, for example, 1000 circumferential transparent electrodes 44-1 to 44-n are formed and a pitch in the radial direction in this case is equal to 100 µm. On the contrary, a size of radial transparent electrode is on the wavelength order. When the average pixel pitch in the circumferential direction assumes 1 µm, the number of pixels (in the horizontal direction) is obtained as follows.

$$2 \times \pi \times 250 \times 10^3 = 1{,}570{,}796$$

When the driving of a unit of 256 electrodes is assumed in order to simplify the liquid crystal driving circuit, the necessary number of circuits is obtained as follows.

$$1{,}570{,}796/256 = 6{,}136 \text{ circuits}$$

The radial transparent electrode 46 in this case has a pixel pitch on the wavelength order such that it is equal to 1.2 µm at the outermost periphery and it is equal to 0.8 µm at the innermost periphery.

Figure 5:
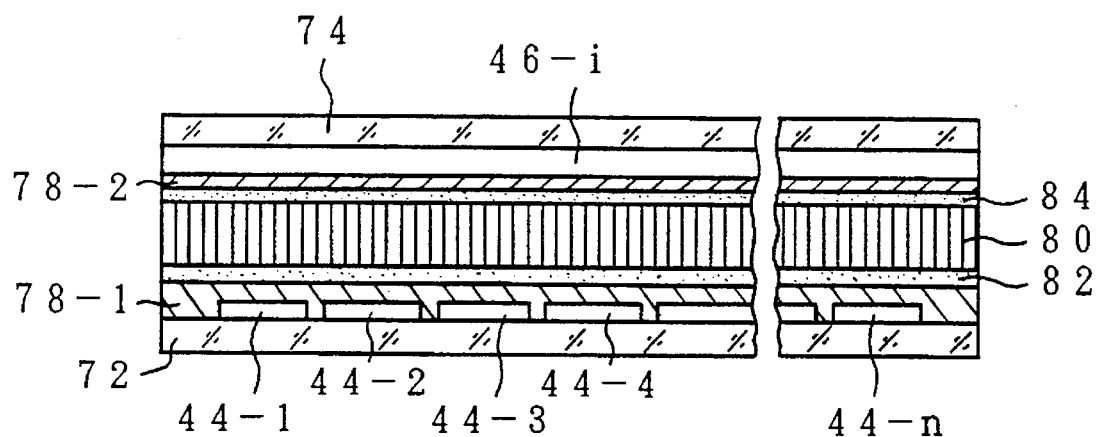
FIG. 5 is a cross sectional view taken along the line V—V in FIG. 4.

FIG. 5 shows a structure of the liquid crystal of a cross section taken along the line V—V in the phase distribution display device 10 in FIG. 4. Glass substrates 72 and 74 are provided on the lower and upper sides. The circumferential transparent electrodes 44-1 to 44-n are formed on the lower glass substrate 72 and are covered by an insulating layer 78-1. Subsequent to the upper glass substrate 74, a radial transparent electrode 46-i existing at the position of the cross section is formed and is covered by an insulating layer 78-2. A liquid crystal 80 is sealed between the insulating layers 78-1 and 78-2 through orientation films 82 and 84, respectively.

Figure 6:
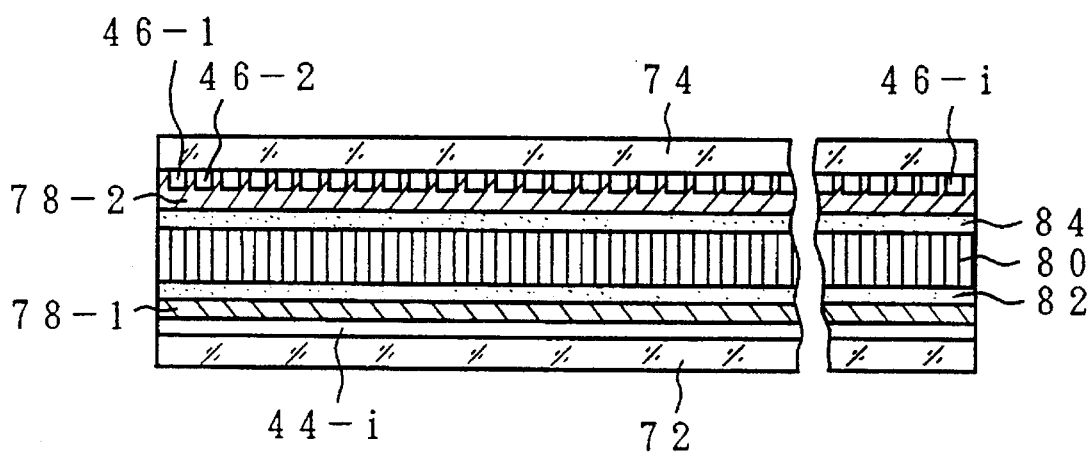
FIG. 6 is a cross sectional view taken along the line VI—VI in FIG. 4.

FIG. 6 is a cross sectional view taken along the line VI—VI in FIG. 4. Although the liquid crystal structure is the same as that of FIG. 5, a dividing state on the wavelength order of the radial transparent electrodes 46-1 to 46-i at the position of an arbitrary circumferential transparent electrode 44-i subsequent to the glass substrate 72 is shown.

Referring again to FIG. 4, in the phase distribution display device 10 using the liquid crystal display apparatus, one pixel is constructed in a region where the circumferential transparent electrodes 44-1 to 44-n intersect the radial transparent electrode 46, cross the orientation (director) of the liquid crystal is changed by a signal voltage applied between the electrodes corresponding to the pixel, thereby enabling the incident light to be modulated. Therefore, as for the driving of the liquid crystal display apparatus, when the circumferential transparent electrodes 44-1 to 44-n are sequentially driven and simultaneously the radial transparent electrode 46 is driven by every driver of each circumferential transparent electrode, thereby displaying on a phase distribution unit basis in the circumferential direction. First, the circumferential transparent electrodes 44-1 to 44-n can be driven by a driving circuit 50 which is equivalent to the horizontal scanning display in an XY display. A data signal line 56 and a timing signal line 58 for giving a timing of a scan time in the circumferential direction are connected from a control circuit 48 to the driving circuit 50. Signal lines 136-1 to 136-n are independently led out from the driving circuit 50 to the circumferential transparent electrodes 44-1 to 44-n.

Figure 7:
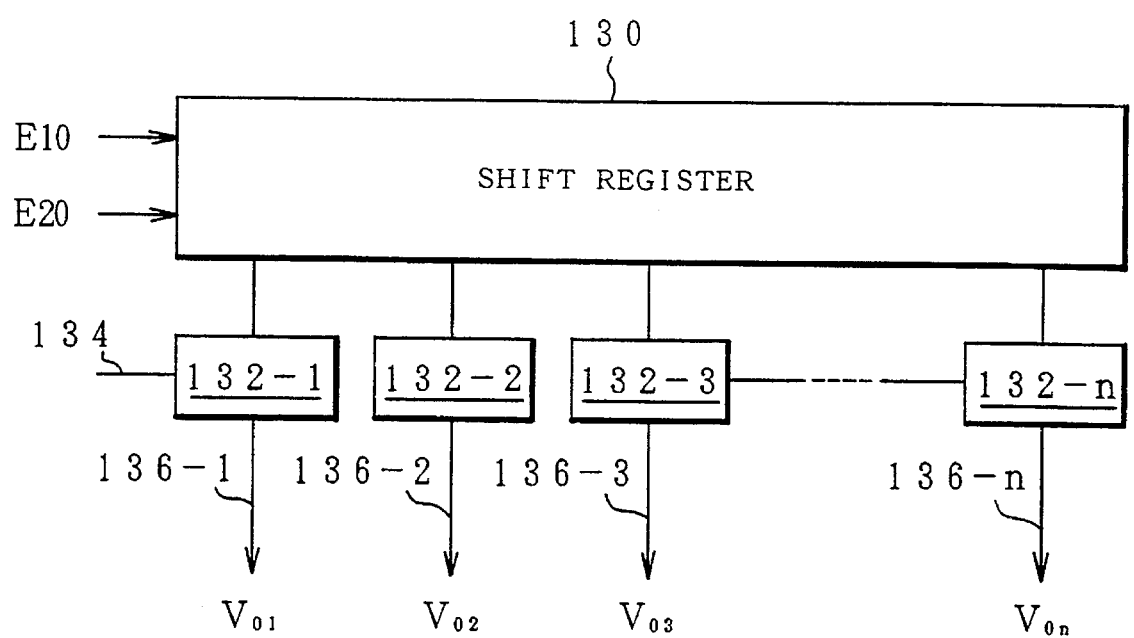
FIG. 7 is a block diagram of a driving circuit of a cylindrical transparent electrode in FIG. 4.

FIG. 7 shows an embodiment of the driving circuit 50 in FIG. 4. The driving circuit to drive the circumferential transparent electrodes comprises a shift register 130 and voltage generating circuits 132-1 to 132-n each for generating a constant electrode application voltage. In case of the embodiment of FIG. 4, 1000 voltage generating circuits are provided. The shift register 130 receives a signal E10 for deciding a scanning period in the circumferential direction and a clock signal E20 for deciding the scan time of one circumferential radial electrode from the control circuit 48. Shift outputs are sequentially generated from the shift register 130 to the voltage generating circuits 132-1 to 132-n every period of the clock signal E20. A voltage supply line 134 is commonly connected to the voltage generating circuits 132-1 to 132-n and outputs predetermined voltage signals V01 to V0n to the signal lines 136-1 to 136-n for a period of time during which the shift output is received from the shift register 130.

Figures 8A, 8B, 8C:
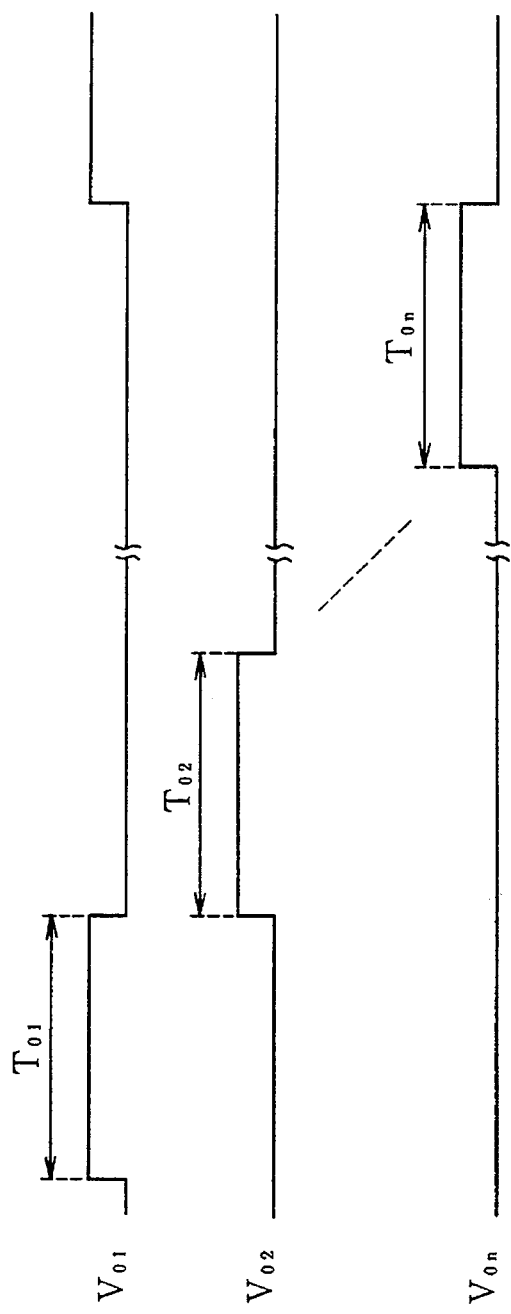
FIGS. 8A to 8C are timing charts for the driving operation of the cylindrical transparent electrode.

FIGS. 8A to 8C are timing charts for the operation of the driving circuit of the circumferential transparent electrode in FIG. 7. The shift register 130 generates a shift output to scan cycles T01, T02, . . . , T0n which are decided by the clock signal E20. The predetermined voltage signals V01 to V0n are sequentially outputted from the voltage generating circuits 132-1 to 132-n to the electrodes. The above operation is repeated.

Referring again to FIG. 4, since the number of radial transparent electrodes 46 each of a predetermined wavelength is enormous, the driving circuit needs to be simplified. As for the driving of the radial transparent electrodes 46, a serial address circuit is provided every predetermined number of radial transparent electrodes 46 and a plurality of the serial address circuits are set to one group and are commonly driven. For example, 256 radial transparent electrodes 46 are set to one unit and serial address circuits 54-1, 54-2, 54-3, . . . are provided as shown in the diagram. The number of serial address circuits is equal to 6136 in the embodiment. For the 6136 serial address circuits, one of driving circuits 52-1, 52-2, . . . is provided per 80 serial address circuits in the embodiment. Therefore, since there are 6136 serial address circuits, the number of driving circuits is equal to 77. A timing signal line 62 and a data signal line 60 are connected from the control circuit 48 to the driving circuits 52-1, 52-2, . . . . A data timing line 64 is commonly shown among the driving circuits 52-1, 52-2, . . . . The timing signal line 62 can be commonly connected to the driving circuits 52-1, 52-2, . . . The data signal line 60 is independently connected to each of the driving circuits 52-1, 52-2, . . . . Every driving period of the circumferential transparent electrodes 44-1 to 44-n by the driving circuit 50, each of the driving circuits 52-1, 52-2, . . . scans to sequentially supply the driving voltage to the eighty serial address circuits 54-1 to 54-80 connected under the domination of the transparent electrode itself in accordance with the order from the first one of the 256 transparent electrodes connected to each serial address circuit. As upper apparatuses of the control circuit 48, a computer main body 68 and a memory device 70 are provided. The computer main body 68 reads out the 1-dimensional holographic phase distribution in the horizontal direction which has preliminarily calculated for a stereoscopic display and which is obtained by dividing a stereoscopic image on the cylindrical screen in the vertical direction from the memory device 70 and supplies phase distribution data to the control circuit 48.

Figure 9:
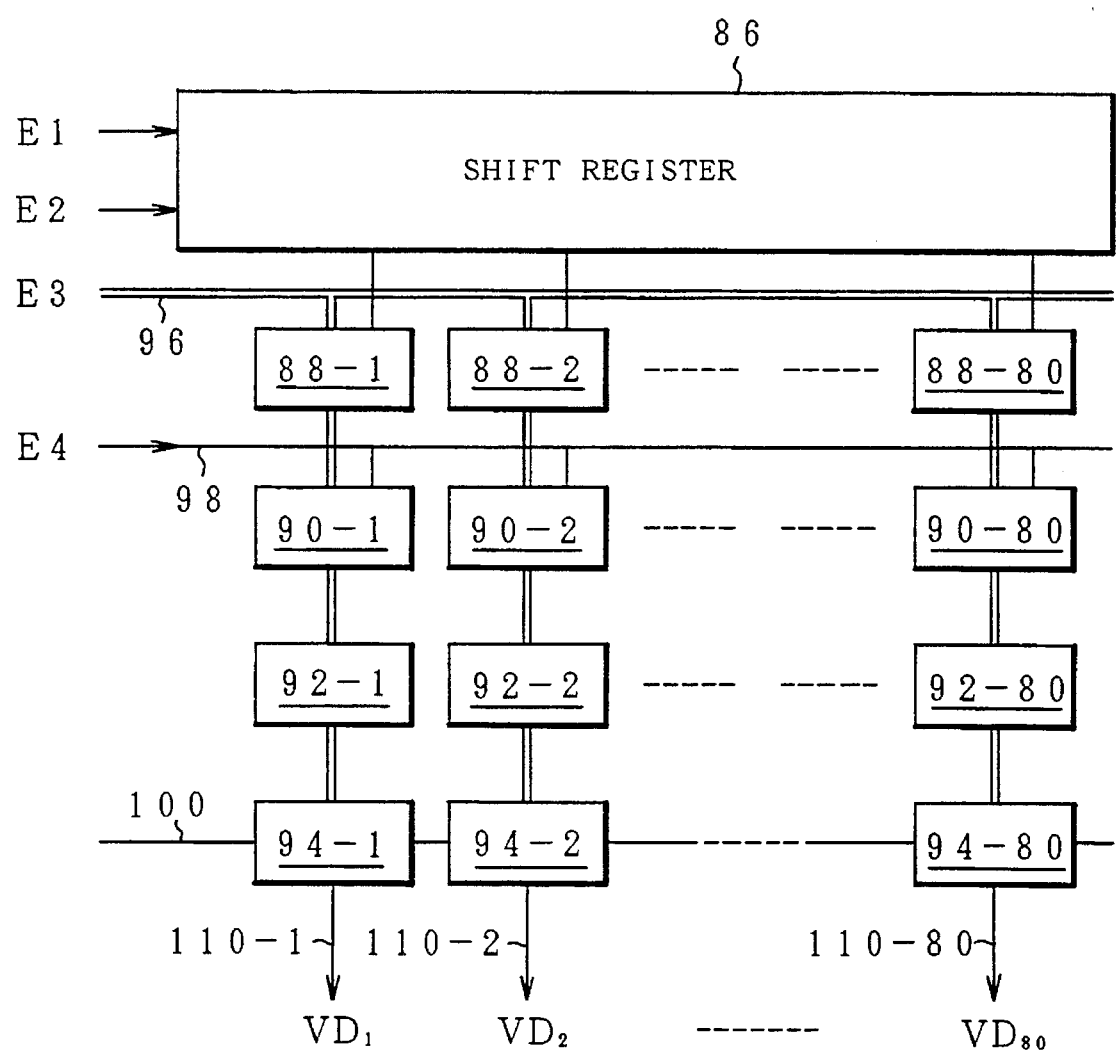
FIG. 9 is a block diagram of a driving circuit of a radial transparent electrode.

FIG. 9 is a diagram showing an embodiment of a driving circuit on the side of the radial transparent electrode 46 in FIG. 4. The driving circuit comprises: a shift register 86; first latch circuits 88-1 to 88-256 of 256 electrodes; second latch circuits 90-1 to 90-256; decoding circuits 92-1 to 92-256; and voltage generating circuits 94-1 to 94-256. A scan signal E1 synchronized with the driving period of the cylindrical transparent electrode and a clock signal E2 having a period for sequentially driving the 256 electrodes in a scanning period are supplied to the shift register 86 from the control circuit 48. Therefore, the shift register 86 sequentially generates 256 shift outputs to the first latch circuits 88-1 to 88-256 synchronously with the clock signal E2 every scanning period of the circumferential transparent electrode which is determined by the scan signal E1. Data E3 is supplied to the first latch circuits 88-1 to 88-256 from the control circuit 48. As data E3, phase distribution data for the 256 electrodes is sequentially transmitted as serial data. Therefore, the data on the data signal line 60 is latched into the corresponding first latch circuit at the timing of the shift output from the shift register 86. By receiving a trigger signal E4 by a trigger signal line 98 at a timing when the data is latched to all of the first latch circuits 88-1 to 88-256, the second latch circuits 90-1 to 90-256 latch the data latched in the first latch circuits 88-1 to 88-256 in a lump and generate them. The data latched in the second latch circuits 90-1 to 90-256 is converted to a level (m) of the driving voltage by the decoding circuits 92-1 to 92-256. For example, when it is now assumed that the data consists of (n) bits, the data is decoded to the voltage level (m=2$^n$). The voltage generating circuits 94-1 to 94-256 produce the voltages from the decoding levels (m) from the decoding circuits 92-1 to 92-256 on the basis of a voltage supplied from voltage supply line 100 and generate driving voltages V1 to V256 to the 256 electrodes via signal lines 110-1 to 110-80, respectively.

Figure 10:
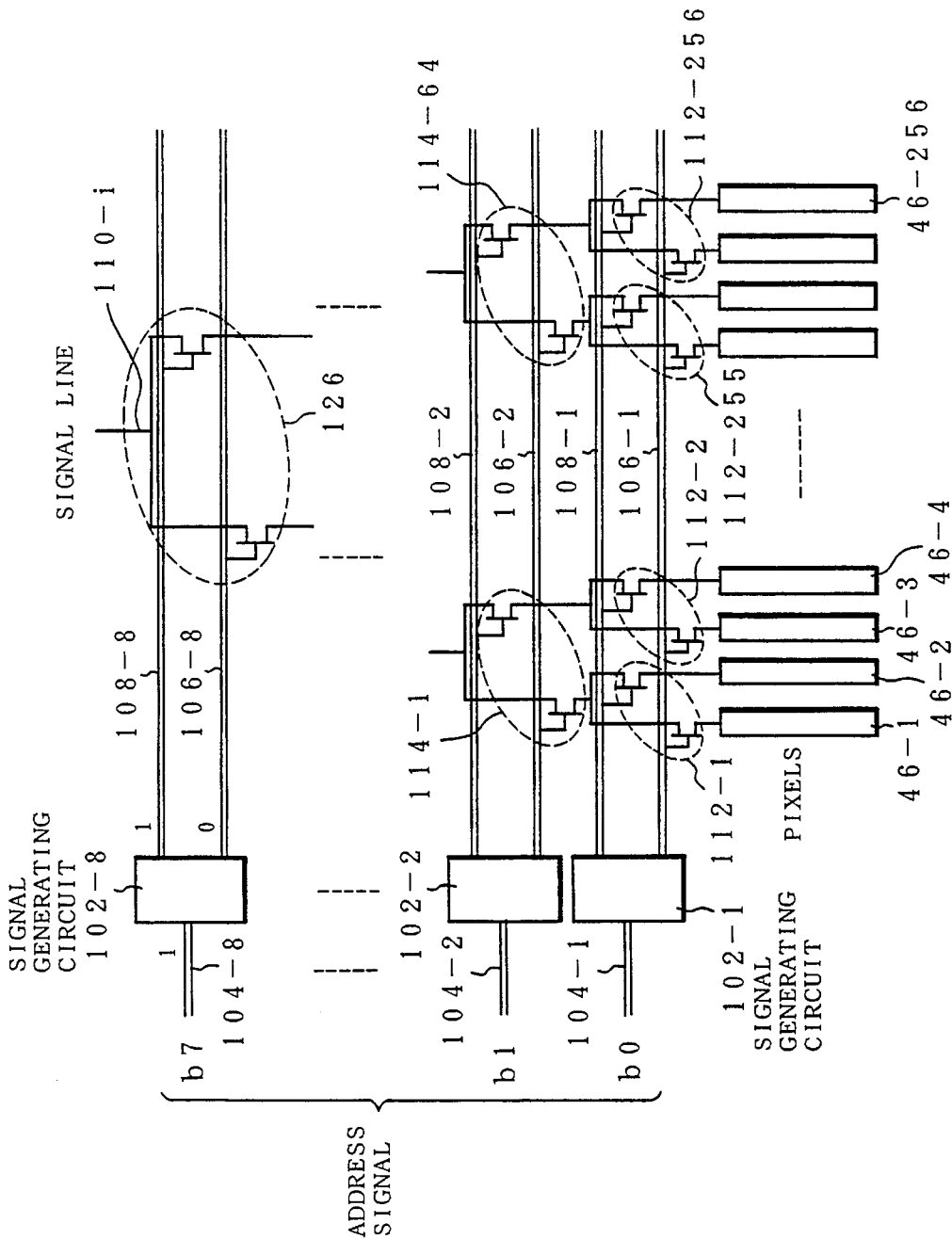
FIG. 10 is a block diagram of a serial address circuit of the radial transparent electrode.

FIG. 10 is a diagram showing an embodiment of the serial address circuits 54-1, 54-2, . . . in FIG. 4 which are provided under the domination of the address circuit in FIG. 9. Address signals b7 to b0 of eight bits are supplied to the serial address circuits by an 8-bit control line 66. Namely, the bit signals b0 to b7 of respective addresses are inputted by address lines 104-1 to 104-8. Signal generating circuits 102-1 to 102-8 are provided in correspondence to the address bit signals b0 to b7. Two kinds of switch control lines 106-1 to 106-8 and 108-1 to 108-8 for outputting switching signals according to the bit inputs 0 and 1 are led out from the signal generating circuits 102-1 to 102-8. Now considering the signal generating circuit 102-1 as an example, when the input signal of the bit b0 is equal to 0, the switch control line 106-1 is enabled. When the input signal of the bit b0 is equal to 1, the switch control line 108-1 is enabled.

A switching circuit having two switching devices using FETs is provided for the two kinds of switch control lines from the signal generating circuits 102-1 to 102-8. As for the number of switching circuits, they are hierarchically provided with respect to the address bits b7 to b0. First, 128 switching circuits 112-1 to 112-128 which are the half of the 256 radial transparent electrodes 46-1 to 46-256 are provided for the switch signal lines 106-1 and 108-1 from the signal generating circuit 102-1 of the least significant bit b0. With respect to the next bit b1, 64 switching circuits 114-1 to 114-64 are provided. In a manner similar to the above, 32 switching circuits are provided for the bit b2, 16 switching circuits are provided for the bit b3, and one switching circuit 126 is provided for the most significant bit b7. A corresponding signal voltage VDi is inputted to the most significant switching circuit 126 by a signal line 110-i.

Figure 11:
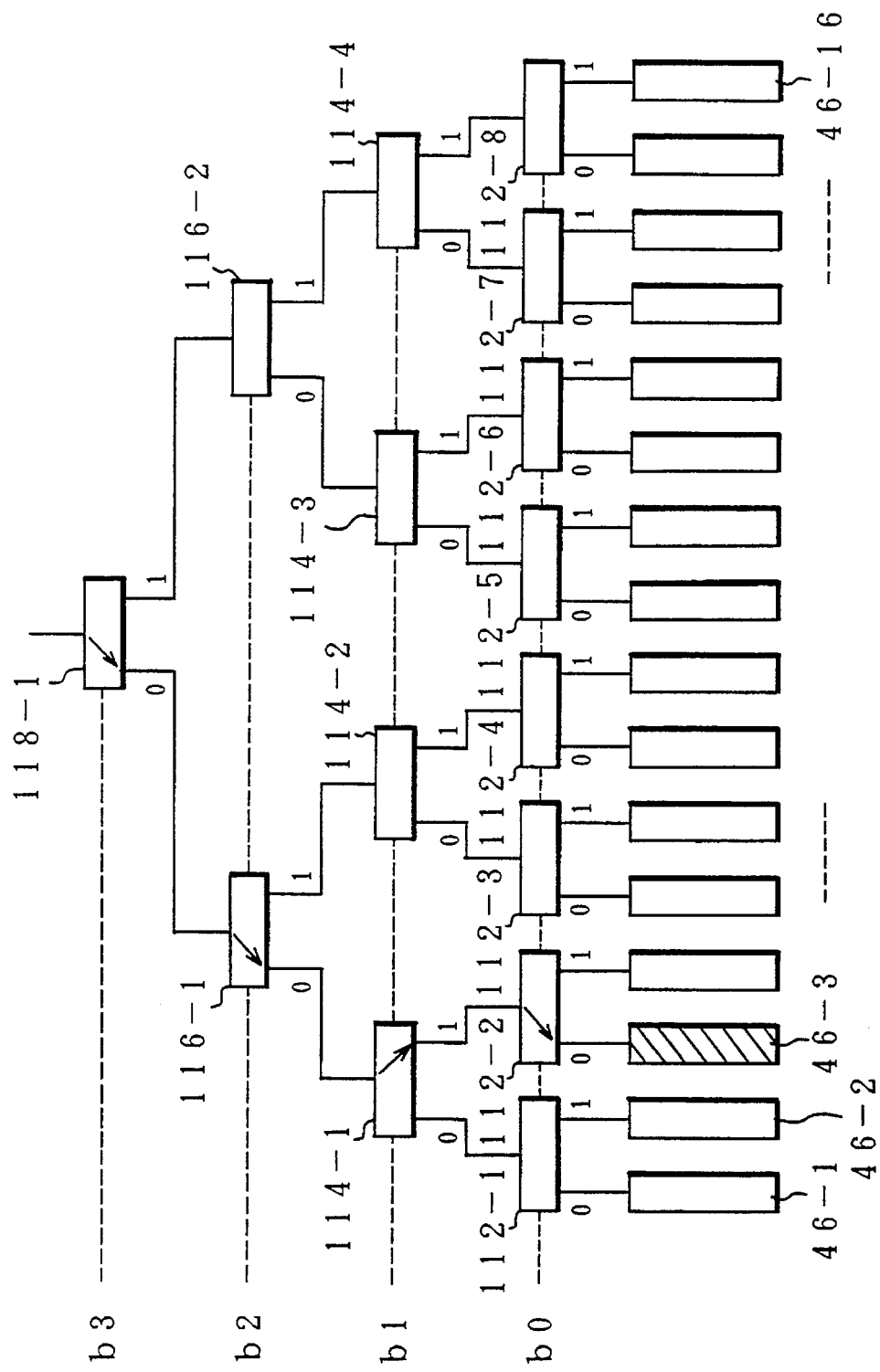
FIG. 11 is a block diagram of a serial address circuit corresponding to lower four bits of an address in FIG. 10.

FIG. 11 shows the operations of the switching circuits in the lower four bits b3 to b0 of the serial address circuits in FIG. 10. As for the lower four bits b3 to b0, the driving voltages are sequentially selectively applied to the 16 radial transparent electrodes 46-1 to 46-16. Each of the switching circuits 112-1 to 112-8, 114-1 to 114-4, 116-1, 116-2, and 118-1 shown by blocks connects the input to the output 0 when each of the address bits b3 to b0 is equal to 0. On the other hand, when each of the bits b3 to b0 is equal to 1, each switching circuit connects the input to the output 1. FIG. 11 shows a switch connection diagram in a state in which the address bits b3, b2, b1, and b0 are set to 0, 0, 1, 0. Namely, the signal is connected from the switching circuit 118-1 to the switching circuit 116-1 and is connected from the switching circuit 116-1 to the switching circuit 114-1 and is, further, connected from the switching circuit 114-1 to the switching circuit 112-2. The driving voltage is applied to the radial transparent electrode 46-3.

FIGS. 12A to 12D are timing charts for the operations of the driving circuits on the radial transparent electrode side in FIG. 9. As data E3 in FIG. 12A, 80 data for the 80 serial address circuits are serially transmitted every scan cycles T1 to T256 which are obtained by dividing a scan period T0 of the circumferential transparent electrode into 256 portions. The data E3 is sequentially latched into the first latch circuits 88-1 to 88-80 every scan cycles T1 to T256 as shown in FIG. 12B. When first 80 data are latched in the scan cycle T1, as shown in FIG. 12C, the first data D1-1 to D1-80 are latched in a lump in the second latch circuits 90-1 to 90-80 by the trigger signal and are decoded and, after that, are converted to the driving voltages. Driving voltages VD0 to VD80 are outputted to the 80 serial address circuits under the domination of the latch circuit itself, namely, to the serial address circuits in FIG. 11. At this timing, an 8-bit address signal 000 is supplied to the serial address circuits as shown in FIG. 12D. Each of the 80 serial address circuits selects the first radial transparent electrode 46-1 and applies the driving voltage thereto. In a manner similar to the above, the data latch, voltage conversion, and the application of the electrode voltage by the address designation are repeated with respect to the remaining scan cycles T2 to T256.

Figure 13:
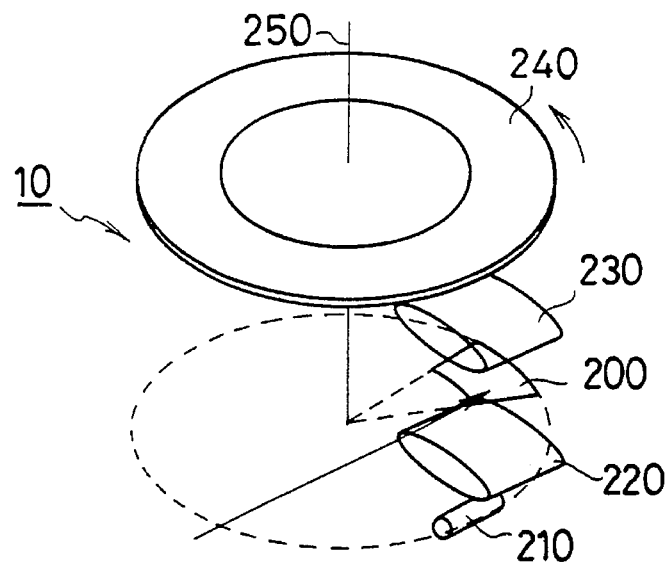
FIG. 13 is an explanatory diagram of another embodiment of a phase display device using a space light modulating apparatus of the light writing type.

FIG. 13 is a diagram showing another embodiment of the phase distribution display device 10 of the invention. This embodiment is characterized in that a fan-shaped liquid crystal display apparatus and a space light modulating apparatus of the light writing type are used. The phase distribution display device 10 comprises: a fan-shaped liquid crystal display apparatus 200; a flash light 210 serving as a writing light source; a lens 220; an image pickup lens 230; and a space light modulating apparatus 240 of the light writing type. The liquid crystal display apparatus 200 is fixedly arranged. The space light modulating apparatus 240 of the light writing type is rotated step by step by a rotary shaft 250.

Figure 12:
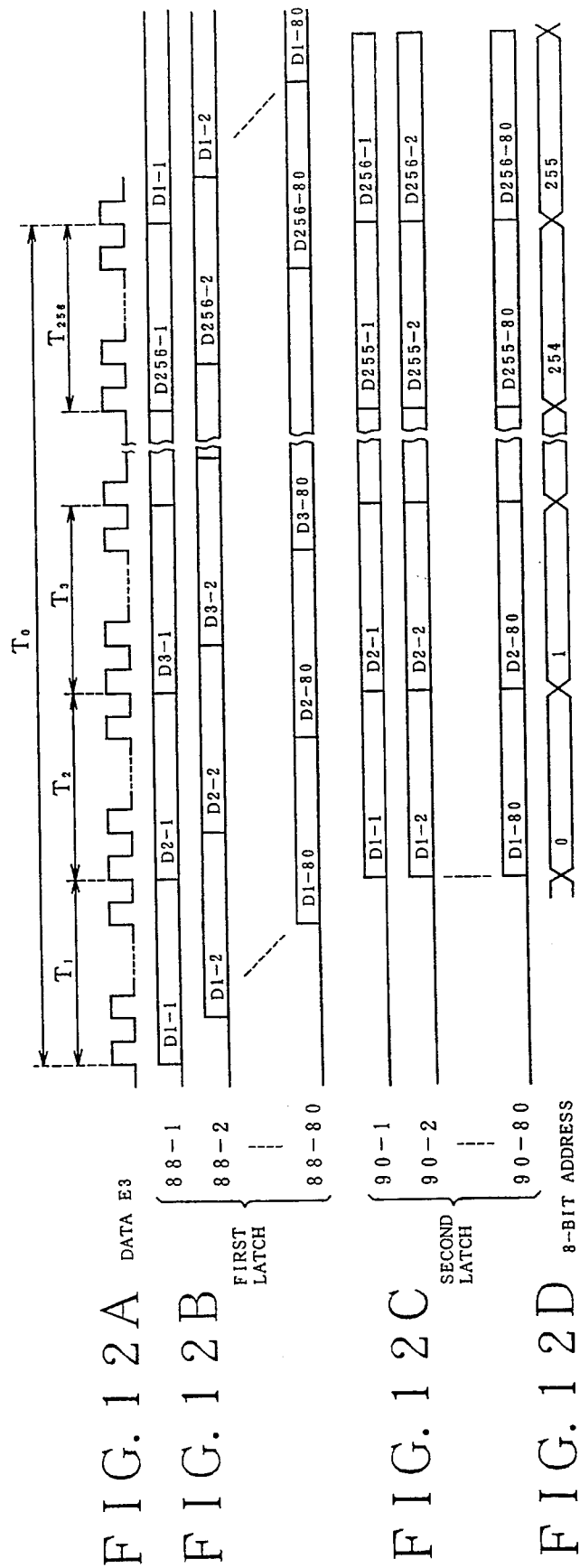
FIGS. 12A to 12D are timing charts for the driving operation of the radial transparent electrode.
Figure 14:
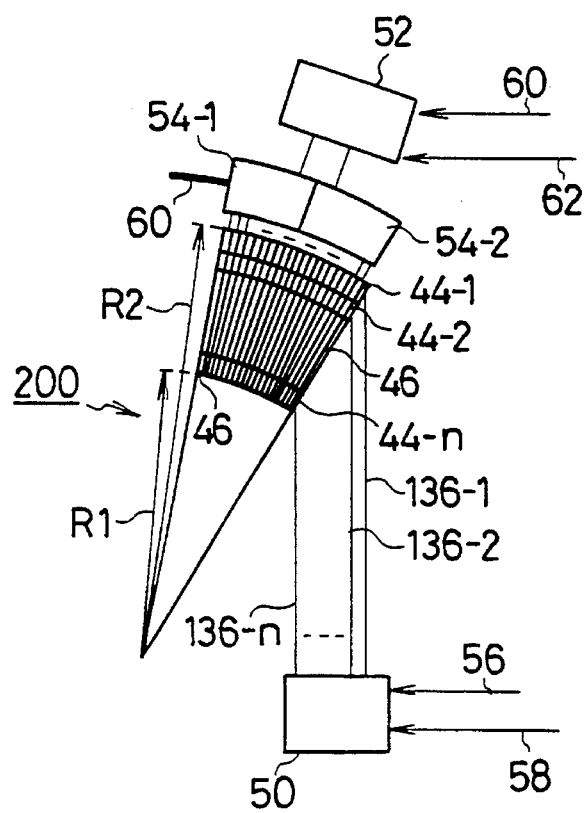
FIG. 14 is an explanatory diagram of a construction of the phase display device in FIG. 13 and driving circuits.

FIG. 14 is a diagram showing the fan-shaped liquid crystal display apparatus 200 in FIG. 13 and its driving circuit. The liquid crystal display apparatus 200 has the same structure as that, for example, 512 portions among the radial transparent electrodes in the liquid crystal display apparatus of FIG. 4 are extracted. Namely, the liquid crystal having a structure of FIGS. 5 and 6 is arranged among the circumferential transparent electrodes 44-1 to 44-n and the 512 radial transparent electrodes 46. A crossing portion of both electrodes constructs one pixel. The driving circuit 50 to drive the circumferential transparent electrodes 44-1 to 44-n, a driving circuit 52 to drive the radial transparent electrodes 46, and the serial address circuits 54-1 to 54-2 are substantially the same as those in the embodiment of FIG. 4 except the following different points. Namely, since only two serial address circuits 54-1 and 54-2 are provided for the driving circuit 52, the scan cycles in FIG. 12 are set to the repetition of two periods T1 and T2 and the driving cycles T01 to T0n of the circumferential transparent electrodes 44-1 to 44-n by the driving circuit 50 are also reduced to (T1+T2) in association with such repetitive scan cycles.

Figure 15:
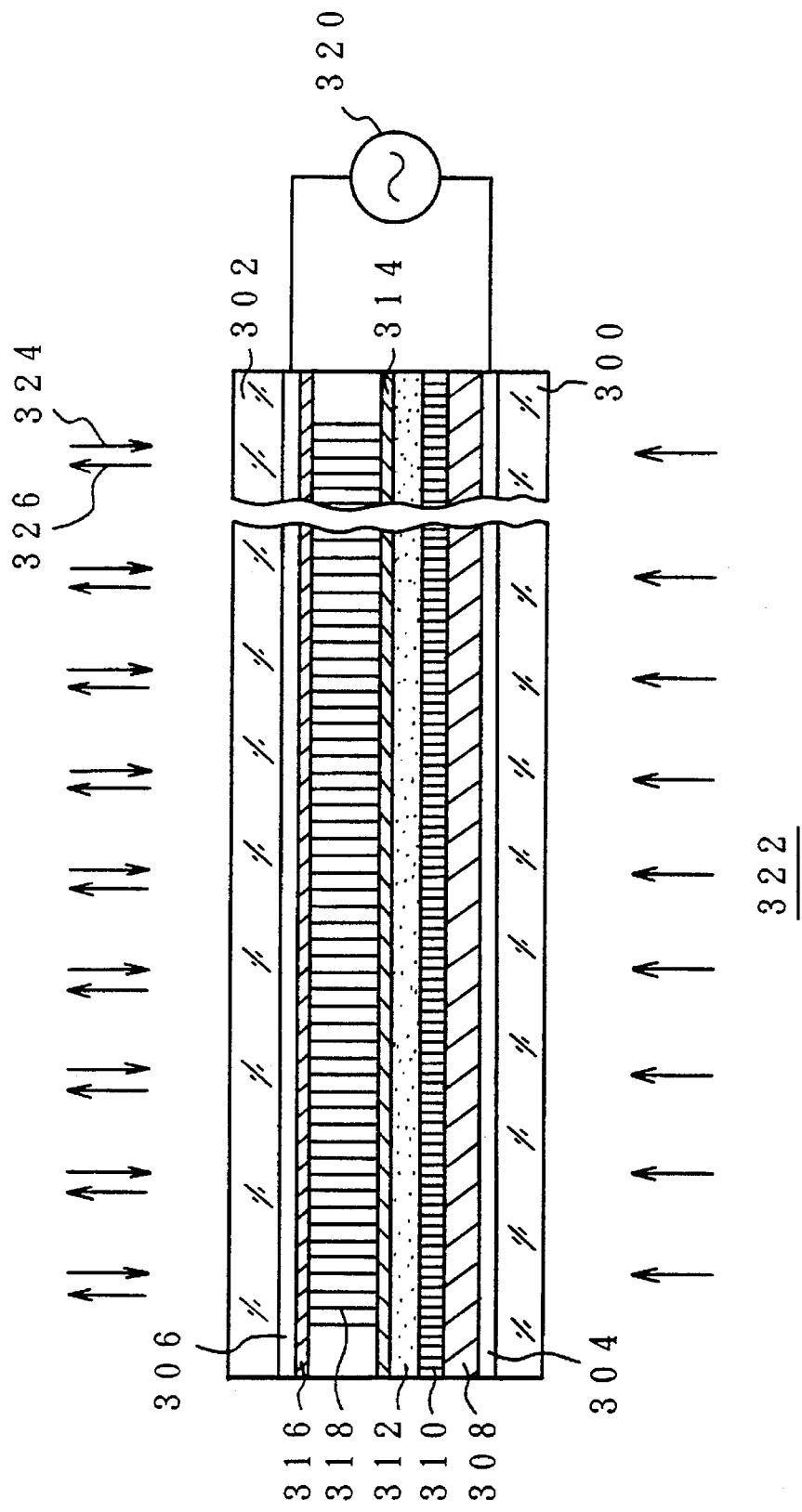
FIG. 15 is an explanatory diagram of a construction of the light writing type space light modulating apparatus in FIG. 14.

FIG. 15 shows a structure of the space light modulating apparatus of the light writing type in FIG. 13. The space light modulating apparatus of the light writing type has upper and lower glass substrates 300 and 302 and transparent electrodes 304 and 306 are subsequently formed. A photoconductive section 308, a light shielding layer 310, and a dielectric mirror 312 are provided subsequent to the lower transparent electrode 304. An orientation film 314 is provided subsequent to the dielectric mirror 312. An orientation film 316 is also provided subsequent to the transparent electrode 306 on the opposite side. A liquid crystal 318 is sealed between the orientation films 314 and 316.

When a write light 322 is received by the photoconductive section 308, a resistance value of the space light modulating apparatus of the light writing type changes in accordance with the light intensity. As the light intensity is large, a resistance value of the photoconductive section 308 decreases. When the resistance value of the photoconductive section 308 changes, although the driving voltage from a driving source 320 is constant, since the resistance value of the photoconductive section 308 changes, a voltage which is applied across the liquid crystal 318 through the dielectric mirror 312 changes by only the level of the resistance value. Thus, a state in which a refractive index of the liquid crystal 318 changed is produced. Such a state is a light writing state. When a read light 324 is inputted from the upper direction in such a state, the light is phase modulated in accordance with a change state of the refractive index of the liquid crystal 318 by the light writing operation when the light is reflected and returned by the dielectric mirror 312 provided subsequent to the light shielding layer 310, so that it is emitted as a modulation light 326.

The operation of the liquid crystal display device 10 in FIG. 13 will now be described. First, in a state in which the space light modulating apparatus 240 of the light writing type is positioned at a predetermined location, a 1-dimensional holographic phase distribution is displayed to the fan-shaped liquid crystal display apparatus 200 and the flash light 210 is driven so as to emit the light. The light emitted from the flash light 210 is converted to the parallel light by the lens 220 and enters the liquid crystal display apparatus 200. A diffraction light of the displayed holographic phase distribution is obtained by the image pickup lens 230. The holographic phase distribution of the liquid crystal display apparatus 200 is inputted as an image to the space light modulating apparatus 240 of the light writing type and is optically written and stored. After completion of the writing operation, the space light modulating apparatus 240 of the light writing type is rotated by only the step of the angle of the fan shape of the liquid crystal display apparatus 200. The writing and storing operations of the next holographic phase distribution are similarly executed. By executing the above processes with respect to the whole circumference of the space light modulating apparatus 240 of the light writing type, the 1-dimensional holographic phase distribution is optically written and recorded to the whole region in the circumferential direction in the space light modulating apparatus 240 of the light writing type in a manner similar to the case of the liquid crystal display apparatus of FIG. 4.

Figure 16:
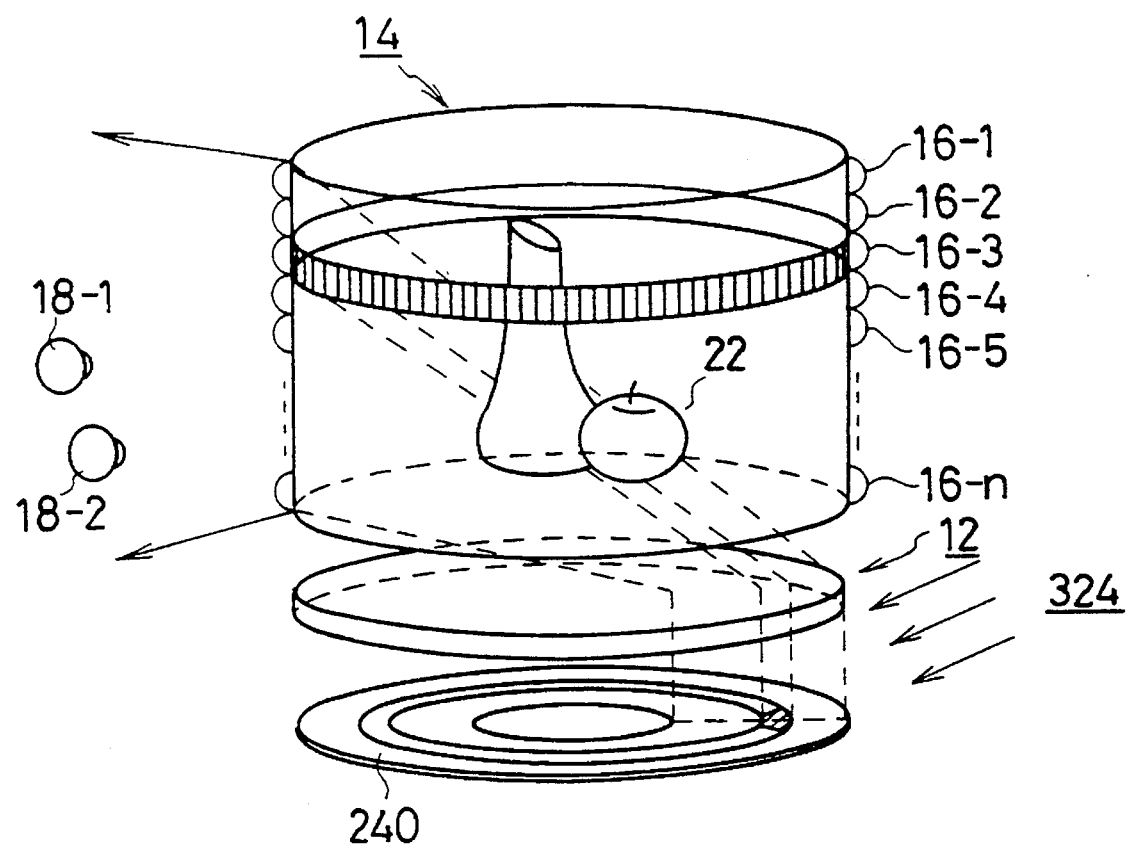
FIG. 16 is an explanatory diagram of a space light modulating apparatus using the phase display device in FIG. 14.

FIG. 16 shows a stereoscopic display apparatus using the space light modulating apparatus 240 of the light writing type in FIG. 13 as a phase distribution display device 10. The writing side in FIG. 13 is omitted. For example, by irradiating the read light 324 from the oblique upper direction to such a space light modulating apparatus 240 of the light writing type, the diffraction light subjected to the modulation in accordance with each circumferential 1-dimensional holographic phase distribution which was optically written and stored is derived by the reflection. The diffraction light is formed as an image onto the cylindrical screen 14 using the lenticular lenses 16-1 to 16-n by the optical system 12 and the visual area is also enlarged in the vertical direction. Therefore, a stereoscopic image 22 can be seen in the cylindrical screen 14 by the least distance of distinguished vision in an arbitrary direction by the eyes 18-1 and 18-2 of the observer.

According to the invention as mentioned above, a holographic stereoscopic display apparatus in which an object can be observed at the least distance of distinguished vision from an arbitrary direction can be easily realized by using a plane-shaped phase distribution display device.

Although the above embodiments have been described with respect to the stereoscopic display by the perfect cylindrical screen as an example, the invention can also be realized as a stereoscopic display apparatus having a semi-cylindrical or an arbitrary cylindrical curved surface instead of the perfect cylindrical shape. In such a case, it is sufficient to use a phase distribution display device of the fan-shaped size according to an angle of the cylindrical screen to be used. The present invention is not limited by the numerical values shown in the embodiments.

What is claimed is:

1. A stereoscopic display apparatus comprising:

a phase distribution display section for recording a holographic phase pattern to stereoscopically display on a plane, for applying a light modulation according to said holographic phase pattern to an incident light, and for emitting the modulated light;

an optical section for forming an image of the light modulated by said phase distribution display section onto a curved screen surface; and a light diffusing section for diffusing in one direction the light formed as an image on said curved screen surface;

wherein said optical section deflects the light modulated by said phase distribution display section onto said curved screen surface and, after that, forms the image;

wherein said optical section has a 0-th order light eliminating section for eliminating a 0-th order light which is generated upon modulation by said phase distribution display section.

2. An apparatus according to claim 1, wherein said curved screen surface is a cylindrical surface.

3. An apparatus according to claim 1, wherein said 0-th order light eliminating section comprises:

a pair of Fourier conversion optical devices; and a space filter which is arranged between said pair of Fourier conversion optical devices and shuts off the light at a 0-th order light transmitting position.

4. An apparatus according to claim 1, wherein said optical section has a deflection optical device in which micro optical devices each for deflecting the incident light onto said curved screen surface are arranged in a concentric disk shape.

5. An apparatus according to claim 4, wherein said deflection optical is a grating lens.

6. An apparatus according to claim 4, wherein said deflection optical device is a Fresnel lens.

7. An apparatus according to claim 1, wherein said phase distribution display section is a disk-shaped space light modulating device and displays a one-dimensional phase distribution to each of regions in the circumferential direction which are obtained by dividing in the radial direction and modulates the incident light.

8. An apparatus according to claim 7, wherein said disk-shaped space light modulating device is a disk member to which a holographic phase pattern has fixedly been recorded.

9. An apparatus according to claim 8, wherein said disk-shaped space light modulating device is a liquid crystal display device to display the holographic phase pattern.

10. An apparatus according to claim 9, wherein said liquid crystal display device comprises:

a plurality of circumferential electrodes which are formed on one surface and are divided in the radial direction; and a plurality of radial electrodes which are formed on a surface opposite to said one surface through a liquid crystal and are divided in the circumferential direction, and wherein a region in an intersecting portion of said circumferential electrode and said radial electrode is set to a display pixel of a discrete holographic phase pattern.

11. An apparatus according to claim 9, wherein said liquid crystal display device comprises:

a transfer control circuit for transferring data of the holographic phase pattern supplied from an outside to the corresponding electrode;

a voltage generating circuit for holding the transfer data to each electrode and generating a corresponding voltage; and a switching circuit for applying the voltage generated from said voltage generating circuit to the electrode designated by address information.

12. An apparatus according to claim 1, wherein said phase distribution display section comprises:

a fan-shaped phase display device having a part of the phase distribution recording regions divided in the radial direction and the circumferential direction; and a disk-shaped space light modulating device having a light writing function for sequentially writing and storing in the circumferential direction the holographic phase pattern displayed by said fan-shaped phase display device, for modulating the incident light in accordance with said written and recorded holographic phase pattern, and for emitting the modulated light.

13. An apparatus according to claim 12, wherein either one of said fan-shaped phase display device and said space light modulating device having said light writing function is fixed and, while rotating the other one, a phase distribution is sequentially written to said space light modulating device.

14. An apparatus according to claim 12, wherein said fan-shaped phase display device is a fan-shaped liquid crystal display device and comprises:

a plurality of circumferential electrodes which are formed on one surface and are divided in the radial direction; and a plurality of radial electrodes which are formed on a surface opposite to said one surface through a liquid crystal and are divided in the circumferential direction, and wherein a region in an intersecting portion of said circumferential electrode and said radial electrode is set to a display pixel of a discrete holographic phase pattern.

15. An apparatus according to claim 14, wherein said liquid crystal display device comprises:

a transfer control circuit for transferring phase distribution data supplied from an outside to the corresponding electrode;

a voltage generating circuit for holding the transfer data to each electrode and for generating a corresponding voltage; and a switching circuit for applying the voltage generated from said voltage generating circuit to the electrode designated by address information.

16. An apparatus according to claim 1, wherein said light diffusing section is a lenticular screen in which a plurality of lenticular lenses each having a microwidth are cylindrically arranged.

17. An apparatus-according to claim 1, wherein said light diffusing section is a holographic screen in which a plurality of holograms each having a microwidth are cylindrically arranged.

18. A stereoscopic display apparatus comprising:

a phase distribution display section for recording a holographic phase pattern to stereoscopically display on a plane, for applying a light modulation according to said holographic phase pattern to an incident light, and for emitting the modulated light;

an optical section for forming an image of the light modulated by said phase distribution display section onto a curved screen surface; and a light diffusing section for diffusing in one direction the light formed as an image on said curved screen surface;

wherein said phase distribution display section is a disk-shaped space light modulating device, and displays a one-dimensional phase distribution to each of regions in the circumferential direction which are obtained by dividing in the radial direction and modulates the incident light.

19. A stereoscopic display apparatus comprising:

a phase distribution display section for recording a holographic phase pattern to stereoscopically display on a plane, for applying a light modulation according to said holographic phase pattern to an incident light, and for emitting the modulated light;

an optical section for forming an image of the light modulated by said phase distribution display section onto a curved screen surface; and a light diffusing section for diffusing in one direction the light formed as an image on said curved screen surface;

wherein said phase distribution display section comprises:

a fan-shape phase display device having a part of the phase distribution recording regions divided in the radial direction and the circumferential direction;

a disk-shaped space light modulating device having a light writing function for sequentially writing and storing in the circumferential direction the holographic phase pattern displayed by said fan-shaped phase display device, for modulating the incident light in accordance with said written and recorded holographic phase pattern, and for emitting the modulated light.

20. A stereoscopic display apparatus comprising:

a flat phase distribution display section for recording a holographic phase pattern onto a flat display surface on which a plurality of pixels are two-dimensionally arranged and which can be electrically rewritten, for applying a light modulation according to said holographic phase pattern to an incident light, and for emitting the modulated light;

an optical section for forming an image of the light modulated by said flat phase distribution display section onto a curved screen surface; and a light diffusing section for diffusing in one direction the light formed as an image on said curved screen surface.

* * * * *